(12) United States Patent
Kageura et al.

(10) Patent No.: US 9,577,256 B2
(45) Date of Patent: Feb. 21, 2017

(54) ELECTRODE MIX, ELECTRODE MIX PASTE, ELECTRODE, AND NON-AQUEOUS ELECTROLYTE SECONDARY BATTERY

(75) Inventors: Jun-ichi Kageura, Tsukuba (JP); Takitaro Yamaguchi, Ryugasaki (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 935 days.

(21) Appl. No.: 13/376,533

(22) PCT Filed: Jun. 2, 2010

(86) PCT No.: PCT/JP2010/059728
§ 371 (c)(1),
(2), (4) Date: Dec. 6, 2011

(87) PCT Pub. No.: WO2010/143641
PCT Pub. Date: Dec. 16, 2010

(65) Prior Publication Data
US 2012/0077083 A1    Mar. 29, 2012

(30) Foreign Application Priority Data

Jun. 8, 2009  (JP) ................................. 2009-136998
Dec. 14, 2009  (JP) ................................. 2009-282667

(51) Int. Cl.
| | |
|---|---|
| *H01M 4/485* | (2010.01) |
| *H01M 4/131* | (2010.01) |
| *H01M 4/36* | (2006.01) |
| *H01M 4/505* | (2010.01) |
| *H01M 4/525* | (2010.01) |
| *H01M 4/62* | (2006.01) |

(52) U.S. Cl.
CPC ............ *H01M 4/485* (2013.01); *H01M 4/131* (2013.01); *H01M 4/366* (2013.01); *H01M 4/505* (2013.01); *H01M 4/525* (2013.01); *H01M 4/621* (2013.01); *H01M 4/622* (2013.01); *H01M 4/623* (2013.01); *H01M 4/625* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,709,788 B2 | 3/2004 | Hosokawa et al. | |
| 7,981,544 B2 | 7/2011 | Morishima | |
| 8,043,387 B2 | 10/2011 | Morishima | |
| 2005/0220700 A1* | 10/2005 | Suhara et al. ............. | 423/594.4 |
| 2005/0227147 A1* | 10/2005 | Kogetsu et al. ......... | 429/231.95 |
| 2008/0193846 A1 | 8/2008 | Morishima | |
| 2008/0248375 A1* | 10/2008 | Cintra ................... | H01M 4/131 429/94 |
| 2009/0305136 A1 | 12/2009 | Yada et al. | |
| 2010/0167127 A1* | 7/2010 | Cheng et al. ................ | 429/221 |
| 2010/0297498 A1* | 11/2010 | Bernard .............. | H01M 4/0404 429/217 |
| 2011/0052987 A1* | 3/2011 | Katayama et al. ........... | 429/221 |

FOREIGN PATENT DOCUMENTS

| | | | |
|---|---|---|---|
| JP | 02-158055 A | | 6/1990 |
| JP | 07-0040485 B | | 5/1995 |
| JP | 2000-030686 | * | 1/2000 |
| JP | 2001-28265 A | | 1/2001 |
| JP | 2001-106534 A | | 4/2001 |
| JP | 2002-042817 A | | 2/2002 |
| JP | 2004-342517 A | | 12/2004 |
| JP | 2005-197073 A | | 7/2005 |
| JP | 2007-103141 A | | 4/2007 |
| JP | 2007-149347 A | | 6/2007 |
| JP | 2008-198465 A | | 8/2008 |
| JP | 2008-198465 A | | 8/2008 |
| JP | 2009-224307 A | | 10/2009 |
| JP | 2010-040383 A | | 2/2010 |
| JP | 2010-055778 A | | 3/2010 |
| JP | 2010-129470 A | | 6/2010 |
| KP | 10-2006-0046546 A | | 5/2005 |

OTHER PUBLICATIONS

International Search Report dated Jun. 8, 2009, issued in PCT/JP2010/059728.
Machine generated translation of JP2001-106534 previously submitted.
Machine generated translation of JP2005-197073 previously submitted.
Communication dated Jun. 21, 2016 from the Korean Intellectual Property Office in counterpart application No. 10-2012-7000296.

\* cited by examiner

*Primary Examiner* — Alix Eggerding
(74) *Attorney, Agent, or Firm* — Sughrue Mion, PLLC

(57) ABSTRACT

An electrode mixture containing a particulate electrode active material, an electrically conductive material and a binder, wherein the electrode active material comprises a particulate core material and a coating material adhering in the form of particles or a layer to the surface of the core material, the core material is obtained by a method comprising a step of coprecipitating two or more transition metal elements, and the binder comprises a water-soluble macromolecule or a water-dispersible macromolecule or both. An electrode comprising the electrode mixture and an electrode collector. An electrode mixture paste containing the electrode mixture and water. A nonaqueous electrolyte secondary battery comprising a positive electrode, a negative electrode and an electrolyte, wherein the positive electrode is the electrode.

10 Claims, No Drawings

ELECTRODE MIX, ELECTRODE MIX PASTE, ELECTRODE, AND NON-AQUEOUS ELECTROLYTE SECONDARY BATTERY

CROSS REFERENCE TO RELATED APPLICATION

This application is a National Stage of International Application No. PCT/JP2010/059728, filed on Jun. 2, 2010, claiming priority based on Japanese Patent Application Nos. 2009-136998, filed Jun. 8, 2009 and JP 2009-282667 filed Dec. 14, 2009, the contents of all of which are incorporated herein by reference in their entirety.

TECHNICAL FIELD

The present invention relates to an electrode mixture, an electrode mixture paste, an electrode, and a nonaqueous electrolyte secondary battery.

BACKGROUND ART

An electrode mixture is used for electrodes in a nonaqueous electrolyte secondary battery and the like. A typical example of the nonaqueous electrolyte secondary battery is a lithium secondary battery. The lithium secondary battery has already been put into practical use as small-size power sources for portable telephones, notebook-sized personal computers, and the like, and further is being attempted to be applied in large-size power sources of automobiles, electric power storages, and the like.

The lithium secondary battery generally includes a positive electrode containing a positive electrode active material capable of being doped and dedoped with lithium ions, a negative electrode containing a negative electrode active material capable of being doped and dedoped with lithium ions, and an electrolyte.

The electrode includes an electrode collector and an electrode mixture mounted on the electrode collector. In order to mount the electrode mixture on the electrode collector, an electrode mixture paste containing the electrode mixture and a dispersion medium is used. Examples of the electrode mixture paste include pastes obtained by mixing and kneading electrode active materials such as a positive electrode active material and a negative electrode active material, a binder and a dispersion medium. Examples of the mixture of the binder and the dispersion medium include organic solvent-based binders that are solutions and the like obtained by dissolving polyvinylidene fluoride (binder) in N-methyl-2-pyrrolidone (dispersion medium). Meanwhile, in order to reduce the production cost up of electrodes, which is caused by the use of an organic solvent, it is known that a mixture of a binder and water (hereinafter, which is also referred to as a water-based binder) is used as the mixture of the binder and the dispersion medium. Specific examples of the water-based binder, which are known, include an aqueous dispersion of polytetrafluoroethylene (JP2-158055A), and an aqueous solution obtained by dissolving a water-soluble macromolecule such as carboxymethyl cellulose or hydroxyethyl cellulose in water (JP2002-42817A and JP2004-342517A).

Incidentally, when the positive electrode active material is a lithium-containing metal composite oxide mainly including lithium nickelate or nickel, the battery capacity of the lithium secondary battery can be increased. However, when the water-based binder such as the aqueous dispersion is used instead of the organic solvent-based binder, water and the positive electrode active material are reacted with each other, causing problems such as the reduction of the discharge capacity of the resultant lithium secondary battery, and the reduction of the charge and discharge cycle characteristics. The problems become remarkable when the lithium secondary battery is discharged with a large amount of electric current.

DISCLOSURE OF THE INVENTION

An object of the present invention is to provide a nonaqueous electrolyte secondary battery obtained by using a water-based binder, in which the decrease of discharge capacity is suppressed with respect to the discharge capacity of a nonaqueous electrolyte secondary battery obtained by using an organic solvent-based binder, and further to provide an electrode mixture, water-based electrode mixture paste and electrode producing the secondary battery.

The present invention provides the following means.

<1> An electrode mixture containing a particulate electrode active material, an electrically conductive material and a binder, wherein the electrode active material includes a particulate core material and a coating material adhering in the form of particles or a layer to the surface of the core material, the core material is obtained by a method including a step of coprecipitating two or more transition metal elements, and the binder comprises a water-soluble macromolecule or a water-dispersible macromolecule or both.

<2> The electrode mixture according to <1>, wherein the core material is a lithium nickel composite metal oxide.

<3> The electrode mixture according to <1> or <2>, wherein the core material is represented by the following formula (A):

$$Li_x(Ni_{1-y}M_y)O_2 \hspace{2em} (A)$$

wherein M is one or more elements selected from the group consisting of Co, Mn and Fe; x is 0.9 or more and 1.3 or less; and y is 0 or more and 0.7 or less.

<4> The electrode mixture according to any one of <1> to <3>, wherein the coating material is an oxide containing Al.

<5> The electrode mixture according to any one of <1> to <4>, wherein the electrically conductive material is a carbonaceous material.

<6> The electrode mixture according to any one of <1> to <5>, wherein the water-soluble macromolecule includes one of more macromolecules selected from the group consisting of methyl cellulose, carboxymethyl cellulose, ethyl cellulose, hydroxyethyl cellulose, hydroxypropylmethyl cellulose, polyethylene glycol, poly(sodium acrylate), polyvinyl alcohol and polyvinyl pyrrolidone.

<7> The electrode mixture according to any one of <1> to <5>, wherein the water-dispersible macromolecule includes one or more macromolecules selected from the group consisting of fluorine-containing macromolecules, vinyl macromolecules, and acrylic macromolecules.

<8> An electrode comprising the electrode mixture according to any one of <1> to <7> and an electrode collector.

<9> A nonaqueous electrolyte secondary battery comprising a positive electrode, a negative electrode and an electrolyte, wherein the positive electrode is the electrode according to <8>.

<10> The nonaqueous electrolyte secondary battery according to <9>, further comprising a separator.

<11> The nonaqueous electrolyte secondary battery according to <10>, wherein the separator is composed of a laminated film comprising a porous film and a heat resistant porous layer laminated thereon.

<12> An electrode mixture paste containing the electrode mixture according to any one of <1> to <7> and water.

MODE FOR CARRYING OUT THE INVENTION

<Electrode Mixture of the Present Invention>

The electrode mixture of the present invention contains a particulate electrode active material, an electrically conductive material and a binder, wherein the electrode active material includes a particulate core material and a coating material adhering in the form of particles or a layer to the surface of the core material, the core material is obtained by a method including a step of coprecipitating two or more transition metal elements, and the binder includes a water-soluble macromolecule or a water-dispersible macromolecule or both.

<Electrode Mixture Paste of the Present Invention>

The electrode mixture paste of the present invention includes the electrode mixture of the present invention and water. More specifically, in the electrode mixture paste of the present invention, the electrode mixture of the present invention is dispersed in water as a dispersion medium. The electrode mixture paste is applied onto an electrode collector, and the resultant electrode collector is dried to obtain an electrode. The dispersion medium is removed by drying, and the electrode mixture is bound to the electrode collector. Specific aspects will be mentioned later.

<Core Material in Electrode Active Material>

The core material in the present invention plays a role of an electrode active material in a nonaqueous electrolyte secondary battery. For example, when the nonaqueous electrolyte secondary battery is a lithium secondary battery, the core material are doped and dedoped with lithium ions. The core material is preferably a lithium nickel composite metal oxide, and more preferably is represented by the following formula (A). When the core material is selected in this way, the capacity of the resultant nonaqueous electrolyte secondary battery, in particular, the capacity of the lithium secondary battery tends to be increased.

$$Li_x(Ni_{1-y}M_y)O_2 \quad (A)$$

wherein M is one or more elements selected from the group consisting of Co, Mn and Fe; x is 0.9 or more and 1.3 or less; and y is 0 or more and 0.7 or less.

From the viewpoint of further increasing the capacity of the secondary battery, M in the formula (A) is preferably Co. At this time, y is preferably 0.05 or more and 0.3 or less. From the viewpoint of increasing the output characteristics, that is, large electric current discharge characteristics, of the secondary battery, it is preferable that M in the formula (A) be Mn, or Mn and Fe. At this time, it is preferable that y be 0.3 or more and 0.7 or less.

<Coating Material of Electrode Active Material>

The coating material of the present invention adheres in the form of particles or a layer to the surface of the core material. This adhesion may be a chemical bonding between the coating material and the core material, or may be physical adsorption therebetween. The coating material may adhere to a part of the surface of the particle of the core material. It is preferable that the coating material cover the entire surface of the particle of the core material. The thickness of the coating material when the coating material covers the surface of the core material is preferably 1 nm to 500 nm, and more preferably 1 nm to 100 nm. The electrode active material in the present invention can play the role as an electrode active material even when the coating material adheres thereto. The coating material is not the same as the core material.

It is preferable that the coating material be an oxide. Specifically, it is more preferable that the coating material be an oxide containing one or more elements selected from the group consisting of Al, B, Ga, In, Mg, Si and Zr. In particular, from the viewpoint of the safety, the coating material preferably contains Al, and more preferably is an oxide containing Al. Specific examples of the Al-containing oxide include one or more oxides selected from the group consisting of $Al_2O_3$, $LiAlO_2$, $Li(Ni_{1-a}Al_a)O_2$, $Li(CO_{1-a}Al_a)O_2$ and $Li(Mn_{1-a}Al_a)_2O_4$ (wherein a is 0 or more and 0.5 or less). From the viewpoint of the charge and discharge cycle characteristics of the nonaqueous electrolyte secondary battery, the Al-containing oxide is preferably $LiAlO_2$ or $Li(Ni_{1-x}Al_x)O_2$ or both.

<Electrically Conductive Material>

In the present invention, examples of the electrically conductive material include carbonaceous materials. More specifically, examples thereof include a graphite powder, carbon black (for example, acetylene black), and fibrous carbonaceous materials (carbon nanotube, carbon nanofiber, vapor phase growth carbon fiber, and the like). Carbon black (for example, acetylene black) is fine particulate and has a large surface area, and, when it is added to the electrode mixture in a small amount, it can enhance the electric conductivity inside the resultant electrode and can improve the charge and discharge efficiency and the large electric current discharge characteristics. In general, the rate of the electrically conductive material in the electrode mixture is 5 parts by weight or more and 20 parts by weight or less relative to 100 parts by weight of the electrode active material. As the electrically conductive material, when fine particulate carbonaceous materials and fibrous carbonaceous materials as mentioned above are used, this rate can be reduced.

<Binder>

In the present invention, the binder plays a role of binding an electrode active material and an electrically conductive material to each other. In the present invention, the binder includes a water-soluble macromolecule or a water-dispersible macromolecule or both.

Examples of the water-soluble macromolecule include one or more macromolecules selected from the group consisting of methyl cellulose, carboxymethyl cellulose, ethyl cellulose, hydroxyethyl cellulose, hydroxypropylmethyl cellulose, polyethylene glycol, poly(sodium acrylate), polyvinyl alcohol and polyvinyl pyrrolidone.

It is preferable that the water-soluble macromolecule play a role as a thickener in the electrode mixture paste in addition to the role as the binder mentioned above. When the water-soluble macromolecule plays a role of a thickener, the viscosity of the electrode mixture paste can be adjusted. Furthermore, the application property of the electrode mixture becomes excellent when the electrode mixture paste is applied onto the electrode collector to prepare an electrode.

The water-soluble macromolecule is preferably a macromolecule that improves the dispersing property of the electrically conductive material in the electrode mixture paste. Examples of such a water-soluble macromolecule include carboxymethyl cellulose, poly(sodium acrylate), polyvinyl alcohol, and polyvinyl pyrrolidone. In general, since the electrically conductive material such as a carbonaceous material is hydrophobic, it is not easily dispersed in water uniformly. When the water-soluble macromolecule has an action of improving the dispersing property of the electrically conductive material in water, the electrically conductive material can be dispersed more uniformly even in the electrode mixture paste. In the electrode prepared by using such an electrode mixture paste containing the water-soluble macromolecule, the electrode active material and the electrically conductive material are dispersed more uniformly, and conductive pass becomes more excellent. Therefore, the resultant nonaqueous electrolyte secondary battery is excellent in battery capacity and battery performance such as large electric current discharge characteristics.

The water-dispersible macromolecules are macromolecules capable of being dispersed in water. A part of water as a dispersion medium (for example, less than 50% by weight with respect to water) may be substituted with an organic solvent that is soluble in water, but it is preferable that only water be used as the dispersion medium. Furthermore, in the present invention, it is preferable that the water-dispersible macromolecule contain one or more macromolecules selected from the group consisting of fluorine-containing macromolecules, vinyl macromolecules and acrylic macromolecules.

Examples of the fluorine-containing macromolecules include polytetrafluoroethylene (PTFE), a tetrafluoroethylene-perfluoro alkyl vinyl ether copolymer (PFA), a tetrafluoroethylene-hexafluoropropylene copolymer (FEP), an ethylene-tetrafluoroethylene copolymer (ETFE), and a tetrafluoroethylene-hexafluoropropylene-perfluoro alkyl vinyl ether copolymer (EPE). As a raw material of the electrode mixture paste, a water-based binder in which the fluorine-containing polymer is dissolved in water can be used. Examples of the vinyl macromolecules include vinyl acetate polymers (a vinyl acetate homopolymer and a vinyl acetate copolymer), and vinyl chloride polymers (a vinyl chloride homopolymer and a vinyl chloride copolymer). Examples of the acrylic macromolecules include alkyl acrylate homopolymers (a methyl acrylate polymer, an ethyl acrylate polymer, and the like), and an alkyl acrylate copolymer. From the viewpoint of controllability of the glass-transition temperature, or the like, the copolymers are preferable among the vinyl macromolecules and acrylic macromolecules. More specific examples of the preferable copolymer include an ethylene-vinyl acetate copolymer, an ethylene-vinyl acetate-vinyl chloride copolymer, vinyl acetate-alkyl acrylate copolymers (a vinyl acetate-methyl acrylate copolymer, a vinyl acetate-ethyl acrylate copolymer, and the like), an ethylene-vinyl chloride copolymer, a vinyl chloride-vinyl acetate copolymer, vinyl chloride-alkyl acrylate copolymers (a vinyl chloride-methyl acrylate copolymer, a vinyl chloride-ethyl acrylate copolymer, and the like), ethylene-vinyl acetate-alkyl acrylate copolymer (an ethylene-vinyl acetate-methyl acrylate copolymer, an ethylene-vinyl acetate-ethyl acrylate copolymer, and the like), and a methyl acrylate-ethyl acrylate copolymer, and two or more thereof may be mixed and used.

Examples of the water-based binder in which the fluorine-containing macromolecules are dispersed in water include aqueous dispersions. As the aqueous dispersion, known dispersions may be used, and a polytetrafluoroethylene aqueous dispersion is preferable. For example, it can be obtained by dispersing polytetrafluoroethylene in water.

Examples of the water-based binders in which the vinyl macromolecules and the acrylic macromolecules are dispersed in water include aqueous emulsions. As the aqueous emulsion, known emulsions may be used, and the aqueous emulsion may be produced by emulsion polymerization such as a surfactant method using a surfactant such as soap, a colloid method using a water-soluble polymer such as polyvinyl alcohol as a protective colloid. Furthermore, it may be produced by a bulk polymerization method, a pre-emulsion dropping method, a monomer dropping method, and the like. By controlling the monomer concentration, the reaction temperature, the stirring speed, and the like, the average particle diameter of various polymers in the aqueous emulsion can be changed. Emulsion polymerization enables the particle size distribution of the polymer to be made sharp. With the use of such an aqueous emulsion, various components in the electrode may be made homogeneous.

In the electrode mixture paste, when an aqueous dispersion or an aqueous emulsion is used as the water-based binder in which the water-dispersible macromolecule is dispersed in water, it is possible to obtain an electrode having excellent binding property between the electrode mixture and the electrode collector, and having excellent peel strength. Therefore, the resultant nonaqueous electrolyte secondary battery can give excellent battery characteristics for a long period of time.

In the present invention, the water-dispersible macromolecule dispersed in an aqueous dispersion or an aqueous emulsion plays a role for binding the electrode active material and the electrically conductive material to each other, and binding them to the electrode collector. In the electrode mixture paste, it is preferable that the water-dispersible macromolecules be dispersed more uniformly. In order that the water-dispersible macromolecules are dispersed in the electrode mixture paste more uniformly, it is preferable that the average particle diameter of the water-dispersible macromolecule be set to 1 to 300% with respect to the average particle diameter of the electrode active material.

As the water-dispersible macromolecule in the present invention, a macromolecule having the glass-transition temperature of 10° C. or less is preferable. In order to control the glass-transition temperature of the macromolecule, the amount of components such as an ethylene component, a butadiene component, and a methyl acrylate component in the macromolecule may be controlled. When the glass-transition temperature is made to be 10° C. or less, flexibility of the resultant electrode can be improved, and it is possible to obtain a nonaqueous electrolyte secondary battery capable of sufficiently being used under the low-temperature environment.

It is preferable that when the water-dispersible macromolecule is used, the binder contain a thickener. It is preferable that the thickener be composed of a water-soluble macromolecule. Herein, as the water-soluble macromolecule, specifically, one or more macromolecules can be selected from the group consisting of the water-soluble macromolecules and used.

In the binder of the present invention, it is preferable that when a mixture of the water-soluble macromolecule and the water-dispersible macromolecule is used, the weight ratio of the water-soluble macromolecule and the water-dispersible macromolecule be from 1:9 to 9:1. By setting the weight ratio as mentioned above, the adhesive strength between the electrode mixtures (between the electrode active material and the electrically conductive material), and between the electrode mixture and the electrode collector can be enhanced. Furthermore, the application property of the electrode mixture paste to the electrode collector can be improved, and an electrode with excellent quality can be supplied more stably.

In the electrode mixture of the present invention, the content of the binder containing the water-soluble macromolecule or the water-dispersible macromolecule or both is preferably 0.1 to 15 parts by weight and more preferably 0.5 to 6 parts by weight with respect to 100 parts by weight of the electrode active material from the viewpoint of improvement of the binding strength of the electrode mixture to the electrode collector and suppression of an increase in the resistance of the resultant electrode.

<Production Method of Core Material>

Furthermore, the core material of the present invention can be obtained by a method including a step of coprecipitating two or more of transition metal elements. By using the core material, a nonaqueous electrolyte secondary battery having extremely excellent charge and discharge cycle characteristics is obtained. A specific example of the method includes a production method including the following steps (1) and (2) in this order.

(1) A step of bringing an aqueous solution containing two or more transition metal elements into contact with a precipitant so as to obtain a coprecipitate slurry.

(2) A step of obtaining a coprecipitate from the coprecipitate slurry.

In the step (1), as the aqueous solution containing two or more transition metal elements (hereinafter, also referred to as a transition metal aqueous solution), for example, when the core material is a lithium nickel composite metal oxide as represented by the formula (A), an aqueous solution containing Ni and M (M is one or more elements selected from the group consisting of Co, Mn and Fe) may be used, and the composition of Ni:M (molar ratio) in the aqueous solution may be (1-y):y. As the respective transition metal element raw materials, compounds such as chloride, nitrate, acetate, formate, and oxalate may be used, respectively. The transition metal aqueous solution can be obtained by dissolving such compounds in water. When transition metal element raw materials, for example, oxides, hydroxides, and metal materials, which are difficult to be dissolved in water, are used as the raw materials, the transition metal aqueous solution can be also obtained by dissolving these raw materials in acids such as hydrochloric acid, sulfuric acid, and nitric acid or an aqueous solution of such acids.

In the step (1), as the precipitant, one or more compounds selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), $(NH_4)_2CO_3$ (ammonium carbonate), and $(NH_2)_2CO$ (urea) can be used. Hydrates of these compounds may be used, or a combination of the compound and the hydrate may be used. It is preferable that the precipitant be used in a state of an aqueous solution by dissolving the precipitant in water.

In the step (1), examples of a method of bringing the transition metal aqueous solution and the precipitant into contact with each other include a method of adding the precipitant (including a precipitant in an aqueous solution state) to the transition metal aqueous solution, a method of adding the transition metal aqueous solution to the precipitant in an aqueous solution state, and a method of adding the transition metal aqueous solution and the precipitant (including a precipitant in an aqueous solution state) to water. It is preferable that stirring be carried out at the time of addition thereof. In the step (1), a coprecipitate slurry can be obtained by the contact.

In the step (2), a coprecipitate is obtained from the coprecipitate slurry. Any methods may be employed for the step (2) as long as the coprecipitate can be obtained, but from the viewpoint of the operability, a method by solid-liquid separation such as filtration is preferably used. The coprecipitate can be also obtained by a method of heating the coprecipitate slurry by, for example, spray drying so as to volatilize the liquid.

In the step (2), when the coprecipitate is obtained by solid-liquid separation, it is preferable that the step (2) be the following step (2').

(2') A step of subjecting the coprecipitate slurry to solid-liquid separation, followed by washing and drying thereof to obtain a coprecipitate.

In the step (2'), when impurities, for example, alkali and Cl, are excessively present in a solid component obtained after the solid-liquid separation, the impurities can be removed by washing. From the viewpoint of washing the solid component efficiently, it is preferable to use water as a washing solution. Water-soluble organic solvents such as alcohol and acetone may be added to the washing solution if necessary. Washing may be carried out twice, for example, washing with the water-soluble organic solvent may be carried out again after washing with water is carried out.

In the step (2'), the coprecipitate is obtained by drying the solid component after washing. Drying is usually carried out by heat treatment, but drying may be carried out by air blow drying, vacuum drying, or the like. When drying is carried out by heat treatment, the heat treatment temperature is usually around from 50° C. to 300° C., and preferably around from 100° C. to 200° C.

The coprecipitate obtained as mentioned above is a composite metal compound containing two or more transition metal elements. When alkali such as alkali metal or ammonium is used as the precipitant, the composite metal compound is a composite metal hydroxide. For example, when nickel and cobalt are coprecipitated by bringing a transition metal aqueous solution containing nickel and cobalt into contact with a precipitant containing alkali, a nickel-cobalt composite hydroxide is obtained.

For example, when the core material is a lithium nickel composite metal oxide, a mixture obtained by mixing the coprecipitate, a lithium-containing compound, and inactive flux if necessary is calcined, and the resultant calcined product is pulverized if necessary. Thus, a particulate core material can be obtained.

Examples of the lithium-containing compound include one or more anhydrides and/or one or more hydrates selected from the group consisting of lithium hydroxide, lithium chloride, lithium nitrate and lithium carbonate. Examples of the inactive flux include chlorides such as NaCl, KCl, and $NH_4Cl$, fluorides such as NaF, KF, and $HN_4F$, and boric acid. When the inactive flux is mixed, the reaction activity of the mixture is improved in calcination, and the particle diameter of the primary particle, particle diameter of the secondary particle and BET specific surface area of the resultant core material may be adjusted. Two or more inactive fluxes can be used. The inactive flux may remain in the core material after calcination, or may be removed by washing of the core material after calcination, or by evaporation of the inactive flux, or the like.

Mixing may be carried out by dry mixing or wet drying, but from the viewpoint of convenience, dry mixing is preferable. Examples of a mixing device include a stirring mixing machine, a V-type mixing machine, a W-type mixing machine, a ribbon mixing machine, a drum mixer, and a ball mill.

The retention temperature in the calcination affects the particle diameter of the primary particle, particle diameter of the secondary particle and BET specific surface area of the resultant core material. In general, as the retention temperature becomes higher, the particle diameter of the primary particle and the particle diameter of the secondary particle tend to be larger, and the BET specific surface area tends to be smaller. The retention temperature in calcination depends upon the types of the transition metal elements used, and precipitants, and it is usually around from 400° C. to 1200° C., and preferably around from 500° C. to 1100° C. The period of time retained at the retention temperature is usually 0.1 to 20 hours, and preferably 0.5 to 10 hours. Temperature rising speed to the retention temperature is usually 50 to 400° C./hour, and the temperature decreasing speed from the retention temperature to room temperature is usually 10 to 400° C./hour. Furthermore, examples of the calcination atmosphere include air, oxygen, nitrogen, argon, or a mixture gas thereof.

The core material obtained as mentioned above may be pulverized by a ball mill or a jet mill. Pulverization and calcination may be repeated twice or more. The core materials may be washed or classified if necessary. In this way, by a method including a step of coprecipitating two or more transition metal elements, a particulate core material can be obtained.

<Production Method of Electrode Active Material>

With the use of the core material, by allowing a coating material to adhere on the surface of the core material as mentioned below, an electrode active material can be obtained. For example, when a raw material of the coating material and the core material are mixed with each other, and the mixture is subjected to heat treatment if necessary, the electrode active material can be obtained.

Examples of the raw material of the coating material to be used include oxides, hydroxides, carbonates, nitrates, sulfates, halides, oxalates, and alkoxides, and oxides are preferable. When, for example, the coating material is an oxide containing Al, the raw material of the coating material is preferably alumina.

In order that the raw material of the coating material is covered on the surface of the core material more efficiently, the particles of the raw material of the coating material are preferably finer than those of the core material. Specifically, the BET specific surface area of the raw material of the coating material is preferably five times or more, and more preferably 20 times or more than the BET specific surface area of the core material. As to the amount of the raw material of the coating material relative to the amount of the core material, the molar ratio of the core material:raw material of the coating material is around 1:0.01 to 0.15.

Mixing of the raw material of the coating material and the core material may be carried out in the same manner as in the mixing at the time of production of the core material. A preferable method is a method of mixing with the use of a powder mixing machine equipped with a stirring blade inside, that is, a method of mixing with the use of a mixing device that is not provided with mixed media such as a ball, and not provided with strong pulverization. When mixing is carried out by using a mixing device provided with mixing media, media having a soft surface such as a nylon-coated steel ball can be used.

The heating treatment condition (temperature and retention time) in the heat treatment, which is carried out as needed, after the mixing of the raw material of the coating material and the core material may be different depending upon the kind of the raw material of the coating material. The heat treatment temperature is preferably set to the same level as the retention temperature of calcination at the time of production of the core material (for example, the retention temperature of calcination at the time of production of the core material of about −30° C. or more, and the retention temperature of calcination at the time of production of the core material of about +30° C. or less). It is preferable that the retention time in the heat treatment be set to be shorter than the retention time of calcination. The atmosphere in the heat treatment is the same atmospheric gas as in the calcination.

The coating material is allowed to adhere in a form of a layer on the surface of the particles of the core material by technique such as sputtering, CVD, and vapor deposition, and the electrode active material can be obtained.

<Production Method of Electrode Mixture Paste>

The electrode mixture paste of the present invention can be produced by kneading the electrode active material, the electrically conductive material, the binder and water.

As the mixing machine to be used for kneading, a device having a high shearing force is preferable. Specific examples thereof include devices such as a planetary mixer, a kneader, and an extrusion kneading machine. Furthermore, from the viewpoint of improvement of the dispersing property of various components in the electrode mixture paste, when a dispersing machine such as a homogenizer is used, aggregation of the various components in the electrode mixture paste is relieved, and a more homogeneous electrode mixture paste can be produced.

The concentration of the electrode mixture in the electrode mixture paste, that is, the concentration of the electrode active material, electrically conductive material and binder with respect to the electrode mixture paste is usually 30 to 90% by weight, preferably 30 to 80% by weight, and more preferably 30 to 70% by weight from the viewpoint of the thickness of the resultant electrode and the application property.

The electrode mixture paste of the present invention contains the specific electrode active material, electrically conductive material, specific binder and water mentioned above.

<Electrode of the Present Invention>

The electrode of the present invention will be described. The electrode of the present invention includes the electrode mixture of the present invention and an electrode collector. Specifically, the electrode of the present invention is obtained by applying the electrode mixture paste of the present invention onto the electrode collector, and drying the resultant product. With the drying, the water content in the electrode mixture paste is removed, the electrode mixture is bound to the electrode collector, and thus the electrode is obtained.

In the electrode of the present invention, as the electrode collector, Al, Ni, stainless steel, and the like, can be used. From the viewpoint that processing into a thin film is easily carried out and the cost is low, Al is preferable. Examples of the shape of the electrode collector include a foil shape, a plate shape, a mesh shape, a net shape, a lath shape, a punching metal shape, an emboss shape and combinations thereof (for example, a mesh-shaped plate). Concavities and convexities may be formed on the surface of the electrode collector by etching.

Examples of a method of applying the electrode mixture paste of the present invention onto the electrode collector include a slit die coating method, a screen coating method, a curtain coating method, a knife coating method, a gravure coating method, and an electrostatic spray method. Furthermore, drying after application may be carried out by heat treatment, or it may be carried out by air blow drying, vacuum drying, or the like. When drying is carried out by heat treatment, the temperature is usually around from 50 to 150° C. Furthermore, pressing may be carried out after drying. With the methods described above, the electrode of the present invention can be produced. Furthermore, the thickness of the electrode is usually around from 5 to 500 µm.

<Nonaqueous Electrolyte Secondary Battery of the Present Invention>

The electrode of the present invention is extremely useful as a positive electrode in a nonaqueous electrolyte secondary battery. In this case, in a nonaqueous electrolyte secondary battery including a positive electrode, a negative electrode and an electrolyte, the positive electrode is the electrode of the present invention. Specifically, the nonaqueous electrolyte secondary battery can be produced as mentioned below. An electrode group obtained by laminating or laminating and winding a separator, a negative electrode, a separator and a positive electrode sequentially in this order is accommodated in a battery case such as a battery can, and then filling the case with an electrolytic solution composed of an organic solvent containing an electrolyte.

Examples of the shape of the electrode group include a shape whose cross section in the direction perpendicular to the axis of winding of the electrode group is circle, ellipse, rectangle, and rounded rectangle. Furthermore, examples of the shapes of the battery include a paper type, a coin type, a cylindrical type, and a square type.

<Nonaqueous Electrolyte Secondary Battery of the Present Invention—Negative Electrode>

The negative electrode may be any negative electrode as long as it is capable of being doped and dedoped with lithium ions at a lower electric potential than that of the positive electrode, and examples thereof include an electrode obtained by allowing a negative electrode collector to support a negative electrode mixture containing a negative electrode material, or an electrode composed of a simple substance of a negative electrode material. Examples of the negative electrode material include a carbonaceous material, chalcogen compounds (oxides, sulfides, and the like), nitride, and a material that is a metal or alloy capable of being doped and dedoped with lithium ions at a lower electric potential than that of the positive electrode. Furthermore, two kinds or more of the negative electrode material may be mixed and used.

Examples of the negative electrode material are described below. Specific examples of the carbonaceous material include graphite such as natural graphite and artificial graphite, cokes, carbon black, thermal decomposition carbons, carbon fiber, and an organic macromolecule calcined product. Specific examples of the oxide include oxides of silicon represented by the formula $SiO_x$ (herein, x denotes a positive real number) such as $SiO_2$ and $SiO$; oxides of titanium represented by the formula $TiO_x$ (herein, x denotes a positive real number) such as $TiO_2$ and $TiO$; oxides of vanadium represented by the formula $VO_x$ (herein, x denotes a positive real number) such as $V_2O_5$ and $VO_2$; oxides of iron represented by the formula $FeO_x$ (herein, x denotes a positive real number) such as $Fe_3O_4$, $Fe_2O_3$ and $FeO$; oxides of tin represented by the formula $SnO$ (herein, x denotes a positive real number) such as $SnO_2$ and $SnO$; oxides of tungsten represented by the formula $WO_x$ (herein, x denotes a positive real number) such as $WO_3$ and $WO_2$; and composite metal oxides containing lithium and titanium and/or vanadium, such as $Li_4Ti_5O_{12}$, and $LiVO_2$ (for example, $Li_{1.1}V_{0.9}O_2$). Specific examples of the sulfide include sulfides of titanium represented by the formula $TiS_x$ (herein, x denotes a positive real number) such as $Ti_2S_3$, $TiS_2$ and $TiS$; sulfides of vanadium represented by the formula $VS_x$ (herein, x denotes a positive real number) such as $V_3S_4$, $VS_2$ and $VS$; sulfides of iron represented by the formula $FeS_x$ (herein, x denotes a positive real number) such as $Fe_3S_4$, $FeS_2$ and $FeS$; sulfides of molybdenum represented by the formula $MoS_x$ (herein, x denotes a positive real number) such as $Mo_2S_3$ and $MoS_2$; sulfides of tin represented by the formula $SnS_x$ (herein, x denotes a positive real number) such as $SnS_2$ and $SnS$; sulfides of tungsten represented by the formula $WS_x$ (herein, x denotes a positive real number) such as $WS_2$; sulfides of antimony represented by the formula $SbS_x$ (herein, x denotes a positive real number) such as $Sb_2S_3$; and sulfides of selenium represented by the formula $SeS_x$ (herein, x denotes a positive real number) such as $Se_5S_3$, $SeS_2$, and $SeS$. Specific examples of the nitride include lithium-containing nitrides such as $Li_3N$, $Li_{3-x}A_xN$ (herein, A is Ni and/or Co, and x satisfies 0<x<3). Such carbonaceous materials, oxides, sulfides, and nitrides may be used in combination of two or more thereof. They may be crystalline or amorphous. Furthermore, these carbonaceous materials, oxides, sulfides, and nitrides are mainly used as an electrode in a state in which they are supported on the negative electrode collector.

Furthermore, specific examples of the metal include lithium metal, silicon metal, and tin metal. Furthermore, examples of the alloy include lithium alloys such as Li—Al, Li—Ni and Li—Si, silicon alloys such as Si—Zn, and tin alloys such as Sn—Mn, Sn—Co, Sn—Ni, Sn—Cu, and Sn—La, and further include alloys such as $Cu_2Sb$ and $La_3Ni_2Sn_7$. Such metals and alloys are mainly used singly as an electrode (for example, they are used in a foil shape).

From the viewpoint that the electric potential flatness is high, the average discharge electric potential is low, and the cycling characteristic is good in the resultant battery, a carbonaceous material mainly including graphite such as natural graphite and artificial graphite is preferably used among the negative electrode materials. Examples of the shape of the carbonaceous material include a flake shape like natural graphite, a spherical shape like mesocarbon microbeads, a fibrous shape like graphitized carbon fiber, and an aggregated body of fine powders.

The negative electrode mixture may contain a binder if necessary. Examples of the binder include thermoplastic resins. Specific examples thereof include PVdF, thermoplastic polyimide, carboxymethyl cellulose, polyethylene, and polypropylene.

Examples of the negative electrode collector include Cu, Ni, and stainless steel. Cu is preferably used because it does not easily form an alloy with lithium and it is easily processed into a thin film. As a method of allowing the negative electrode collector to support a negative electrode mixture, a method by pressure molding, a method of making the negative electrode mixture into paste by using, for example, a dispersion medium, applying the resultant paste onto the negative electrode collector, and drying thereof, and the like, are employed. Pressing may be carried out after drying. Herein, the dispersion medium may be any of water and an organic solvent, but from the viewpoint of suppressing an increase in production cost caused by the use of an organic solvent-based binder, it is preferable that a water-soluble macromolecule or a water-dispersible macromolecule or both be used as the binder, and that water is used as the dispersion medium. When a water-soluble macromolecule or a water-dispersible macromolecule or both are used for both the positive electrode and the negative electrode, an environmentally friendly battery can be provided at a low cost.

<Nonaqueous Electrolyte Secondary Battery of the Present Invention—Separator>

As the separator, it is possible to use a member having a form of a porous film, non-woven fabric, woven fabric, and the like, composed of, for example, polyolefin resins such as polyethylene and polypropylene, a fluorocarbon resin, and a nitrogen-containing aromatic polymer. The separator may be composed of two or more kinds of the materials, and the members may be laminated. Examples of the separator include separators described in JP2000-30686A and JP10-324758A. From the viewpoint that the volume energy density is increased and the internal resistance is reduced in a battery, the thickness of the separator is made to be thin as long as the mechanical strength thereof can be maintained. The thickness of the separator is usually 5 to 200 μm, and preferably 5 to 40 μm.

The separator preferably has a porous film containing a thermoplastic resin. In the nonaqueous electrolyte secondary battery, the separator is disposed between the positive electrode and the negative electrode. It is preferable in the nonaqueous electrolyte secondary battery that the separator have a function by which, when an abnormal current flows in the battery because of short circuit between the positive electrode and the negative electrode, and the like, the current is interrupted to block (shutdown) the flow of excessive current. Herein, the shutdown is carried out by obstructing micropores of the porous film in the separator when the temperature exceeds the usual temperature for use. Then, after the shutdown, it is preferable that even if the temperature in the battery is increased to some extent, film destruction due to the temperature should not occur, and the shutdown state is maintained. Examples of such a separator include a laminated film obtained by laminating a heat resistant porous layer and a porous film onto each other. When such a film is used as a separator, the heat resistant property of a secondary battery in the present invention can be enhanced. In the laminated film, the heat resistant porous layer may be laminated onto both surfaces of the porous film.

<Nonaqueous Electrolyte Secondary Battery of the Present Invention—Separator—Laminated Film>

Hereinafter, a laminated film including the porous film and the heat resistant porous layer laminated thereon is described.

In the laminated film, the heat resistant porous layer has higher heat resistance than the porous film. The heat resistant porous layer may be composed of an inorganic powder, or may contain a heat-resistant resin. Because the heat resistant porous layer contains a heat resistant resin, the heat resistant porous layer can be formed by an easy technique such as coating. Examples of the heat-resistant resin include polyamide, polyimide, polyamide-imide, polycarbonate, polyacetal, polysulfone, polyphenylene sulfide, polyether ketone, aromatic polyester, polyether sulfone, and polyether imide. From the viewpoint of enhancing the heat resistance, polyamide, polyimide, polyamide-imide, polyether sulfone, and polyether imide are preferable; and polyamide, polyimide, and polyamide-imide are more preferable. Further preferable examples thereof include nitrogen-containing aromatic polymers such as aromatic polyamides (para-oriented aromatic polyamide and meta-oriented aromatic polyamide), aromatic polyimide, and aromatic polyamide-imide; and among them, preferable examples thereof include aromatic polyamide (aramid). Para-oriented aromatic polyamide (hereinafter, may be also referred to as "para-aramid") is particularly preferable in production aspect. As the heat-resistant resin, poly-4-methyl pentene-1 and a cyclic olefin polymer can be used. When such heat-resistant resins are used, the heat resistance of the laminated film, that is, the thermal film breaking temperature of the laminated film can be further enhanced. When a nitrogen-containing aromatic polymer is used among the heat-resistant resins, depending upon the polarity of the molecule, excellent compatibility with respect to the electrolytic solution may be achieved, and the liquid-retaining property of the electrolytic solution in the heat resistant porous layer may be improved. Thus, in the production of the nonaqueous electrolyte secondary battery, filling speed of the electrolytic solution is increased, and the charge and discharge capacity of the nonaqueous electrolyte secondary battery is also enhanced.

The thermal film breaking temperature of the laminated film depends upon the kinds of the heat-resistant resins, and it is selected and used according to the place of use and the purpose of use. More specifically, the thermal film breaking temperature can be controlled to around 400° C. when the nitrogen-containing aromatic polymer is used as the heat-resistant resin, to around 250° C. when poly-4-methyl pentene-1 is used as the heat-resistant resin, and to around 300° C. when the cyclic olefin polymer is used as the heat-resistant resin, respectively. When the heat resistant porous layer is composed of an inorganic powder, the thermal film breaking temperature may be able to be controlled to, for example, 500° C. or more.

The para-aramid is obtained by condensation polymerization of para-oriented aromatic diamine and para-oriented aromatic dicarboxylic acid halide. The para-aramid is substantially composed of a repeating unit in which an amide bond is bound at the para-position or orientation position according to the para-position of the aromatic ring (for example, an orientation position extending coaxially or parallel in the reverse direction, such as 4,4'-biphenylene, 1,5-naphthalene, and 2,6-naphthalene). Specific examples thereof include para-aramids having a para-oriented structure or a structure corresponding to the para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloro-paraphenylene terephthalamide), and a paraphenylene terephthalamide/2,6-dichloroparaphenylene terephthalamide copolymer.

The aromatic polyimide is preferably a wholly aromatic polyimide produced by condensation polymerization of aromatic dianhydride and diamine. Specific examples of the dianhydride include pyromellitic acid dianhydride, 3,3',4,4'-diphenylsulfone tetracarboxylic acid dianhydride, 3,3',4,4'-benzophenone tetracarboxylic acid dianhydride, 2,2'-bis(3,4-dicarboxyphenyl)hexafluoropropane, and 3,3',4,4'-biphenyltetracarboxylic acid dianhydride. Specific examples of the diamine include oxydianiline, para-phenylenediamine, benzophenone diamine, 3,3'-methylenedianiline, 3,3'-diaminobenzophenone, 3,3'-diaminodiphenyl sulfone, and 1,5'-naphthalene diamine. Furthermore, polyimide soluble in a solvent can be suitably used. Examples of such a polyimide include a polyimide of a polycondensate of 3,3',4,4'-diphenylsulfone tetracarboxylic acid dianhydride and an aromatic diamine.

Examples of the aromatic polyamide-imide include a product obtained by condensation polymerization of aromatic dicarboxylic acid and aromatic diisocyanate, and a product obtained by condensation polymerization of aromatic diacid anhydride and aromatic diisocyanate. Specific examples of the aromatic dicarboxylic acid include isophthalic acid, and terephthalic acid. Specific examples of the aromatic dianhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylane diisocyanate, and m-xylene diisocyanate.

From the viewpoint of enhancing ionic permeability, the thickness of the heat resistant porous layer is preferably thin, and specifically, the thickness is 1 μm or more and 10 μm or less, further preferably 1 μm or more and 5 μm or less, and particularly preferably 1 μm or more and 4 μm or less. Furthermore, the heat resistant porous layer has micropores, and the pore size (diameter) thereof is usually 3 μm or less, and preferably 1 μm or less. Furthermore, when the heat resistant porous layer contains the heat resistant resin, the heat resistant porous layer further can also contain the below-mentioned filler.

In the laminated film, it is preferable that the porous film have micropores and have a shutdown function. In this case, the porous film contains a thermoplastic resin. The size of the micropore in the porous film is usually 3 μm or less, and preferably 1 μm or less. The porosity of the porous film is usually 30 to 80 vol %, and preferably 40 to 70 vol %. In the nonaqueous electrolyte secondary battery, when the temperature exceeds the usual temperature for use, the porous film containing a thermoplastic resin can obstruct the micropores by the softening of the thermoplastic resin constituting the porous film.

As the thermoplastic resin, any thermoplastic resin can be selected as long as it is not dissolved in an electrolytic solution in the nonaqueous electrolyte secondary battery. Specific examples thereof include polyolefin resins such as polyethylene and polypropylene, and thermoplastic polyurethane resins, and two or more thereof may be used. From the viewpoint of being softened and shutdown at lower temperatures, it is preferable that the porous film contain polyethylene. Specific examples of the polyethylene include low-density polyethylene, high-density polyethylene, and linear polyethylene, and also include polyethylene having an ultrahigh molecular weight, that is, a molecular weight of one million or more. From the viewpoint of enhancing the puncture strength of the porous film, the thermoplastic resin constituting the film preferably contains polyethylene having an ultrahigh molecular weight. In the aspect of production of a porous film, the thermoplastic resin may preferably contain wax composed of polyolefin having a low molecular weight (weight-average molecular weight: 10000 or less) in some cases.

The thickness of the porous film in the laminated film is usually 3 μm to 30 μm, and further preferably 3 μm to 25 μm. In the present invention, the thickness of the laminated film is usually 40 μm or less, and preferably 20 μm or less. It is preferable that the value of A/B be 0.1 or more and 1 or less, where the thickness of the heat resistant porous layer is A (μm) and the thickness of the porous film is B (μm).

When the heat resistant porous layer contains the heat-resistant resin, the heat resistant porous layer may contain one or more filler. The filler may be selected from any of an organic powder, an inorganic powder, and a mixture thereof. Particles constituting the filler have an average particle diameter of 0.01 μm or more and 1 μm or less.

Examples of the organic powder include powders composed of organic substances such as copolymers of single or two or more of styrene, vinyl ketone, acrylonitrile, methyl methacrylate, ethyl methacrylate, glycidyl methacrylate, glycidyl acrylate, methyl acrylate, and the like; fluorine-containing resins, e.g., polytetrafluoroethylene, an ethylene tetrafluoride-propylene hexafluoride copolymer, an ethylene tetrafluoride-ethylene copolymer, and polyvinylidene fluoride; a melamine resin; a urea resin; polyolefin; and polymethacrylate. These organic powders may be used singly or in mixture of two or more thereof. Among these organic powders, from the viewpoint of the chemical stability, a polytetrafluoroethylene powder is preferable.

Examples of the inorganic powder include powders composed of inorganic substances such as metal oxide, metal nitride, metal carbide, metal hydroxide, carbonate, and sulfate. Among these substances, powders made of inorganic substances having low conductivity are preferably used. Specific examples thereof include powders composed of alumina, silica, titanium dioxide, or calcium carbonate. The inorganic powders may be used singly or in mixture of two or more thereof. Among these inorganic powders, from the viewpoint of chemical stability, alumina powder is preferable. It is more preferable that all the particles constituting the filler be alumina particles. It is furthermore preferable that all the particles constituting the filler be alumina particles, and part or all of them be substantially spherical alumina particles. When the heat resistant porous layer is formed of an inorganic powder, the above-exemplified inorganic powders may be used, and a binder may be mixed therewith and used if necessary.

The content of the filler when the heat resistant porous layer contains the heat resistant resin, although depending upon the specific gravity of the material of the filler, is, for example, the weight of the filler is usually 5 or more and 95 or less, preferably 20 or more 95 or less, and more preferably 30 or more and 90 or less, when the total weight of the heat resistant porous layer is made to be 100, in the case where all the particles constituting the filler are alumina particles. Such ranges can be appropriately set according to the specific gravity of the material of the filler.

An example of the shape of the particles constituting the filler includes a substantially spherical shape, a plate shape, a columnar shape, a needle-like shape, a whisker shape, and a fiber shape, and any of shapes may be used. From the viewpoint that uniform pores can be formed easily, substantially spherical particles are preferable. The substantially spherical particles include particles having an aspect ratio (particle major axis/particle minor axis) is in the range of 1 or more and 1.5 or less. The particle aspect ratio can be measured by an electron micrograph.

In the secondary battery, from the viewpoint of ion permeability, the separator has an air permeability according to the Gurley method of preferably from 50 to 300 second/100 cc, and further preferably from 50 to 200 second/100 cc. Furthermore, the porosity of the separator is usually 30 to 80 vol %, and preferably 40 to 70 vol %. The separator may be a laminate of separators having different porosities.

<Nonaqueous Electrolyte Secondary Battery of the Present Invention—Electrolytic Solution>

In the secondary battery, the electrolytic solution is usually composed of an organic solvent containing an electrolyte. Examples of the electrolyte include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (herein, BOB denotes bis(oxalato)borate), lower aliphatic carboxylic acid lithium salts, and $LiAlCl_4$. A mixture of two or more thereof may be used. Usually, among them, one or more fluorine-containing lithium salts selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$.

Examples of the organic solvent in the electrolytic solution include carbonates such as propylene carbonate, ethylene carbonate, dimethyl carbonate, diethyl carbonate, ethyl methyl carbonate, 4-trifluoromethyl-1,3-dioxolane-2-on, and 1,2-di(methoxycarbonyloxy)ethane; ethers such as 1,2-dimethoxyethane, 1,3-dimethoxy propane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propanesultone, and substances in which a fluorine substituent is introduced into the above-mentioned organic solvent. Mixed solvents including two or more thereof are usually used. Among them, a mixed solvent containing carbonates is preferable, and a mixed solvent of cyclic carbonate and non-cyclic carbonate, or a mixed solvent of cyclic carbonate and ethers are further preferable. As the mixed solvent composed of cyclic carbonate and non-cyclic carbonate, from the viewpoint that the operation temperature range is wide, a load property is excellent, the negative electrode material composed of graphite materials such as natural graphite and artificial graphite is not easily decomposed, a mixed solvent containing ethylene carbonate, dimethyl carbonate and ethyl methyl carbonate is preferable. From the viewpoint that it is capable of obtaining a particularly excellent effect of improving safety, an electrolytic solution including a lithium salt containing fluorine such as $LiPF_6$ and an organic solvent having a fluorine substituent is preferably used. A mixed solvent containing ethers having a fluorine substituent such as pentafluoropropyl methyl ether and 2,2,3,3-tetrafluoropropyl difluoromethyl ether and dimethyl carbonate is further preferable because of its discharge property with a large electric current.

<Nonaqueous Electrolyte Secondary Battery of the Present Invention—Solid Electrolyte>

Instead of the electrolytic solution, a solid electrolyte may be used. Examples of the solid electrolyte include organic macromolecule electrolytes such as a polyethylene oxide macromolecule, a macromolecule including at least one of a polyorganosiloxane chain and a polyoxyalkylene chain. It is possible to use a gel-type electrolyte in which the macromolecule is allowed to retain an electrolytic solution. An inorganic solid electrolyte including sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, and $Li_2S$—$SiS_2$—$Li_2SO_4$ may be used. Use of such solid electrolytes may further enhance the safety. Furthermore, when the solid electrolyte is used in the nonaqueous electrolyte secondary battery of the present invention, the solid electrolyte may play a role as a separator. In such a case, a separator may not be needed.

EXAMPLES

Next, the present invention is described in more detail with reference to examples.

Production Example 1

Production of Core Material C1

Lithium hydroxide monohydrate in an amount of 6.43 kg and a nickel-cobalt composite hydroxide ($Ni_{0.85}Co_{0.15}(OH)_2$) in an amount of 13.8 kg were weighed, respectively. They were mixed with each other by using a Loedige mixer (FM-130D type, manufactured by MATSUBO Corporation) to obtain a mixture. Then, the mixture was filled in an alumina sheath, and calcined in an oxygen atmosphere at 730° C. for 10 hours to obtain a particulate core material C1. As a result of the ICP composition analysis of the resultant core material C1, it was found that the molar ratio of Li:Ni:Co was 1.03:0.85:0.15. As a result of the powder X-ray diffraction measurement, it was found that the crystal structure of the core material belongs to the space group R-3m.

Production Example 2

Production of Electrode Active Material A1

The core material C1 in an amount of 10 kg and aluminum oxide in an amount of 0.31 kg (content of Al was 0.06 mol relative to 1 mol of the content of Ni and Co in the core material C1) were mixed in a dry mixing machine (Loedige mixer, FM-130D type, manufactured by MATSUBO Corporation) to obtain a mixed powder. The resultant powder was subjected to heat treatment in an oxygen atmosphere at 750° C. for 1.2 hours to obtain a particulate electrode active material A1 in which a coating material (aluminum compound) is allowed to adhere on the surface of the particle of the core material C1. As a result of the ICP composition analysis of the resultant electrode active material A1, the molar ratio of Li:Ni:Co:Al was 1.03:0.85:0.15:0.06, and as a result of the powder X-ray diffraction measurement, it was found that the crystal structure of the electrode active material A1 belongs to the space group R-3m.

Production Example 3

Production of Aqueous Emulsion 1

In a pressure-resistant container, to 85 parts by weight of water, 33 parts by weight of vinyl acetate, 0.5 parts by weight of hydroxyethyl cellulose, 1 part by weight of a surfactant 1 (product name: "LATEMUL 1135S-70"; manufactured by Kao Corporation; main component: polyoxyethylene undecyl ether; the content of polyethylene alkyl ether whose carbon number in the alkyl group is 11 or less: 90% by weight or more; and average addition number of the polyoxyethylene group n=35), 1 part by weight of a surfactant 2 (product name: "LATEMUL 1108"; manufactured by Kao Corporation; main component: polyoxyethylene undecyl ether; the content of polyethylene alkyl ether whose carbon number in the alkyl group is 11 or less: 90% by weight or more; and average addition number of the polyoxyethylene group n=8), 1 part by weight of sodium lauryl sulfate, 0.002 parts by weight of ferrous sulfate heptahydrate, 0.08 parts by weight of sodium acetate and 0.06 parts by weight of acetic acid were added and dissolved. Next, the inside of the pressure-resistant container was substituted with a nitrogen gas, the inside temperature of the container was increased to 50° C., and then an ethylene gas was introduced thereinto so as to pressurize the inside so that the internal pressure was 6.5 MPa, a 6% sodium persulfate aqueous solution was added at an addition rate of 2.3 parts by weight/hour, and 2.5% by weight of a Rongalite aqueous solution was added at an addition rate of 1.3 parts by weight/hour, thus polymerization was started. Then, it was confirmed that the liquid temperature inside the pressure-resistant container was increased, 67 parts by weight of vinyl acetate, 9 parts by weight of acrylic acid 2-ethyl hexyl and 20 parts by weight of 20% by weight of an N-methylol acrylamide aqueous solution was added over 5 hours, and ethylene was added while maintaining the liquid temperature inside the container at 50° C. so that the pressure was constant at 6.5 MPa for 4 hours. At the time when the residual vinyl acetate monomer was less than 1% by weight, the pressure-resistant container was cooled, unreacted ethylene gas was removed, followed by taking out the product to obtain an ethylene-vinyl acetate-acrylic acid 2-ethylhexyl acid copolymer aqueous emulsion 1 having a copolymer component of 60% by weight and having a viscosity of 100 mPa·s.

Example 1

Electrode Using Water-Based Binder

A1 in Production Example 2 was used as an electrode active material. A1 and an electrically conductive material (a mixture of acetylene black and graphite at the weight ratio of 1:9) were weighed so that the weight ratio of A1:electrically conductive material was 87:10, and they were mixed with each other in an agate mortar to obtain a mixed powder. Furthermore, the aqueous emulsion 1 in Production Example 3 (the content of the copolymer component: 60% by weight) and carboxymethyl cellulose (CMC, manufactured by Aldrich) as a water-soluble macromolecule were weighed so that the weight ratio of the copolymer component of the emulsion:the water-soluble macromolecule was 1:9, and they were mixed with each other to obtain a water-based binder. The mixed powder and the binder were weighed so that the weight ratio of the mixed powder:the solid component of the water-based binder (a copolymer component in emulsion and CMC) was 99.5:0.5, and they were mixed and kneaded to obtain an electrode mixture paste. The electrode mixture paste was applied onto Al foil having a thickness of 40 μm as an electrode collector, and the resultant product was dried at 60° C. for 2 hours to obtain an electrode sheet. Then, the electrode sheet was rolled out by using a roll press at a pressure of 0.5 MPa, and the sheet was punched out into a size of 14.5 mmφ by using a punching machine, and dried under vacuum at 150° C. for 8 hours to obtain an electrode S1. In the electrode S1, water was removed, and an electrode mixture (the electrode active material, the electrically conductive material, and the binder) was bound to the electrode collector.

Comparative Example 1

Electrode Using Organic Solvent-Based Binder

Polyvinylidene fluoride (PVdF) was dissolved in N-methyl-2-pyrrolidone (NMP) to obtain an organic solvent-based binder containing 5.17% by weight of PVdF. Next, the mixed powder (the same as the mixed powder in Example 1) and the organic solvent-based binder were weighed so that the weight ratio of the mixed powder:PVdF was 97:3, and they were mixed and kneaded so as to obtain an electrode mixture paste. The electrode mixture paste was applied onto Al foil having a thickness of 40 μm as an electrode collector, and the resultant product was dried at 60° C. for 2 hours to obtain an electrode sheet. Then, the electrode sheet was rolled out by using a roll press at a pressure of 0.5 MPa, and the sheet was punched out into a size of 14.5 mmφ by using a punching machine, and dried under vacuum at 150° C. for 8 hours to obtain an electrode S11.

Comparative Example 2

Electrode Using Water-Based Binder and Using Core Material as Electrode Active Material An electrode H1 was obtained in the same manner as in Example 1 except that the core material C1 in Production Example 1 was used as the electrode active material.

Comparative Example 3

Electrode Using Organic Solvent-Based Binder and Using Core Material as Electrode Active Material An electrode H11 was obtained in the same manner as in Comparative Example 1 except that the core material C1 in Production Example 1 was used as the electrode active material.

<Preparation of Nonaqueous Electrolyte Secondary Battery>

Each of the electrodes S1, S11, H1, and H11 obtained as mentioned above was used as a positive electrode. As the negative electrode, Li metal was used. As the electrolytic solution, a solution obtained by dissolving $LiPF_6$ in a mixed solution containing ethylene carbonate, dimethyl carbonate and ethyl methyl carbonate at a ratio (volume ratio) of 30:35:35 so that the concentration was 1 mol/liter was used. As the separator, a polyethylene porous film was used. By combining these members, nonaqueous electrolyte secondary batteries 1 to 4 (coin type batteries (R2032)) were prepared. The details are shown in Table 1.

TABLE 1

| Nonaqueous electrolyte secondary battery | Positive electrode | Negative electrode | Separator |
| --- | --- | --- | --- |
| Secondary battery 1 | Electrode S1 | Li metal | Polyethylene porous film |
| Secondary battery 2 | Electrode S11 | Li metal | Polyethylene porous film |
| Secondary battery 3 | Electrode H1 | Li metal | Polyethylene porous film |
| Secondary battery 4 | Electrode H11 | Li metal | Polyethylene porous film |

The nonaqueous electrolyte secondary batteries 1 to 4 were maintained at 25° C., and the battery capacity was measured in the following conditions.

<Measurement Conditions of Battery Capacity>

At the time of charging, the maximum voltage was set to 4.3 V, charging time was set to 8 hours, and charging current was set to 0.2 mA/cm². At the time of discharging, the discharging minimum voltage was set to 3.0 V, discharging current (0.2 C) was 0.2 mA/cm² and discharging current (1 C) was 1.0 mA/cm².

In the secondary battery 1, the discharge capacity at the time of 0.2 C discharge was 178 mAh/g, and the discharge capacity at the time of 1 C discharge was 163 mAh/g.

In the secondary battery 2, the discharge capacity at the time of 0.2 C discharge was 183 mAh/g, and the discharge capacity at the time of 1 C discharge was 172 mAh/g.

When the result of the secondary battery 1 and the result of the secondary battery 2 were compared with each other, the reduction rate of the discharge capacity was 2.8% at the time of 0.2 C discharge and 5.1% at the time of 1 C discharge, which were extremely small. The reduction rate of the discharge capacity was calculated by the following formula.

Reduction rate of discharge capacity (%)={(discharge capacity of secondary battery 2)−(discharge capacity of secondary battery 1)}/(discharge capacity of secondary battery 2)×100

In the secondary battery 3, the discharge capacity at the time of 0.2 C discharge was 182 mAh/g, and the discharge capacity at the time of 1 C discharge was 168 mAh/g.

In the secondary battery 4, the discharge capacity at the time of 0.2 C discharge was 200 mAh/g, and the discharge capacity at the time of 1 C discharge was 189 mAh/g.

When the result of the secondary battery 3 and the result of the secondary battery 4 were compared with each other, the reduction rate of the discharge capacity was 9.4% at the time of 0.2 C discharge and 11.3% at the time of 1 C discharge, which were large. The reduction rate of the discharge capacity was calculated by the following formula.

Reduction rate of discharge capacity (%)={(discharge capacity of secondary battery 4)−(discharge capacity of secondary battery 3)}/(discharge capacity of secondary battery 4)×100

The nonaqueous electrolyte secondary batteries 1 and 3 were maintained at 25° C., and the discharge capacity of each of the batteries was measured under the following conditions, and the output characteristics of each of the batteries were evaluated.

<Measurement Conditions of Battery Capacity>

In charging, the maximum voltage was set to 4.3 V, charging time was set to 8 hours, and charge current was set to 0.2 mA/cm$^2$. In discharging, the discharge minimum voltage was set to 3.0 V, and charge current (5 C) was set to 5.0 mA/cm$^2$.

In the secondary battery 1, the discharge capacity at the time of 5 C discharge was 122 mAh/g, and in secondary battery 3, the discharge capacity at the time of 5 C discharge was 117 mAh/g.

From the results, it is found that in the secondary battery obtained by using an electrode using the electrode mixture of the present invention as a positive electrode of the nonaqueous electrolyte secondary battery, the decrease of the discharge capacity is extremely suppressed relative to the secondary battery obtained by using the organic solvent-based binder. From the evaluation results of the discharge capacity at the time of 5 C discharge, it is found that the secondary battery of the present invention is more excellent in output characteristics as compared with a conventional secondary battery. Furthermore, since the electrode mixture paste of the present invention includes a water-based binder, as compared with the case where an organic solvent-based binder is used, the nonaqueous electrolyte secondary battery can be obtained at a low production cost and by an environmentally friendly method.

Production Example 4

Production of Laminated Film (1) Production of Coating Slurry

In NMP in an amount of 4200 g, calcium chloride in an amount of 272.7 g was dissolved, and then, to the solution, paraphenylenediamine in an amount of 132.9 g was added and completely dissolved. To the resultant solution, terephthalic acid dichloride in an amount of 243.3 g was gradually added to be polymerized so as to obtain para-aramid. The resultant para-aramid was diluted with NMP to obtain a para-aramid solution (A) having a concentration of 2.0% by weight. To the resultant para-aramid solution in an amount of 100 g, an alumina powder (a) in an amount of 2 g (alumina C, manufactured by Nippon Aerosil Co., Ltd., average particle diameter: 0.02 μm) and an alumina powder (b) in an amount of 2 g (Sumicorundum, AA03 manufactured by Sumitomo Chemical Co., Ltd., average particle diameter: 0.3 μm) were added as a filler in a total amount of 4 g and mixed, the resultant mixture was treated by using a nanomizer three times, further filtered through a 1000-mesh wire net, and defoamed under reduced pressure so as to produce a coating slurry (B). The weight of the aluminum powder (filler) with respect to the total weight of the para-aramid and the alumina powder was 67% by weight.

(2) Production and Evaluation of Laminated Film

As the porous film, a porous film made of polyethylene (film thickness: 12 μm, air permeability: 140 second/100 cc, average particle diameter: 0.1 μm, and porosity: 50%) was used. The porous film made of polyethylene was fixed on a PET film having a thickness of 100 μm, and the coating slurry (B) was applied on the porous film by using a bar-coater manufactured by TESTER SANGYO CO., LTD. While the PET film and the coated porous film were integrated, they were immersed in water as a poor solvent, a para-aramid porous film (heat resistant porous layer) was precipitated, and the solvent was then dried to obtain a laminated film 1 in which a heat resistant porous layer and a porous film were laminated. The thickness of the laminated film 1 was 16 μm, and the thickness of the para-aramid porous film (heat resistant porous layer) was 4 μm. The air permeability of the laminated film 1 was 180 second/100 cc, and the porosity was 50%. When the cross section of the heat resistant porous layer of the laminated film 1 was observed by a scanning electron microscope (SEM), it was found that relatively small micropores of about 0.03 μm to 0.06 μm and relatively large micropores of about 0.1 μm to 1 μm were included. The evaluation of the laminated film was carried out by the following method.

<Evaluation of Laminated Film>

(A) Measurement of Thickness

The thickness of the laminated film and the thickness of the porous film were measured according to JIS (K7130-1992). Furthermore, as the thickness of the heat resistant porous layer, a value obtained by subtracting the thickness of the porous film from the thickness of the laminated film was used.

(B) Measurement of Air Permeability by Gurley Method

The air permeability of the laminated film was measured by using a digital timer type GURLEY TYPE DENSOMETER manufactured by YASUDA SEIKI SEISAKUSHO, LTD. according to JIS P8117.

(C) Porosity

A sample of the resultant laminated film was cut into a 10 cm×10 cm square to measure the weight W (g) and thickness D (cm) of the cut film. The weight (Wi (g)) of each layer in the sample was determined and the volume of each layer was determined from Wi and the true specific gravity (true specific gravity: i (g/cm$^3$)) of the material of each layer, thereby obtaining the porosity (vol %) from the following formula.

Porosity(vol %)=100×{1−(W1/true specific gravity 1+W2/true specific gravity 2+ . . . +Wn/true specific gravity n)/(10×10×D)}

In the secondary battery 1, when the same laminated film as that of Production Example 3 is used as the separator, it is possible to obtain a nonaqueous electrolyte secondary battery that can prevent thermal film breaking.

INDUSTRIAL APPLICABILITY

The present invention can provide a nonaqueous electrolyte secondary battery obtained by using a water-based binder, in which the decrease of discharge capacity is suppressed with respect to the discharge capacity of a nonaqueous electrolyte secondary battery obtained by using an organic solvent-based binder. Furthermore, the present invention can provide an electrode mixture, water-based electrode mixture paste and electrode producing the secondary battery. In the present invention, since the electrode mixture paste is obtained by using a water-based binder, a nonaqueous electrolyte secondary battery can be obtained at a low production cost and by an environmentally friendly method as compared with a method using an organic solvent-based binder. The resultant nonaqueous electrolyte secondary battery is extremely excellent in charge and discharge cycle characteristics and, also excellent in output characteristics, and more excellent in safety. Thus, it is extremely industrially useful.

The invention claimed is:

1. An electrode mixture containing a particulate electrode active material, an electrically conductive material and a binder, wherein the electrode active material includes a particulate core material and a coating material adhering in the form of particles or a layer to the surface of the core material, the core material is obtained by a method comprising a step of coprecipitating two or more transition metal elements, and the binder consists essentially of a water-soluble macromolecule and a water-dispersible macromolecule where the water-soluble macromolecule and water-dispersible macromolecule are provided in a weight ratio of 9:1 to 1:9, wherein the water-dispersible macromolecule is at least one selected from the group consisting of an ethylene-vinyl acetate copolymer and ethylene-vinyl acetate-alkyl acrylate copolymer, and the water-soluble macromolecule includes one or more macromolecules selected from the group consisting of carboxymethyl cellulose, polyvinyl alcohol and polyvinyl pyrrolidone.

2. The electrode mixture according to claim 1, wherein the core material is a lithium nickel composite metal oxide.

3. The electrode mixture according to claim 1, wherein the core material is represented by the following formula (A):

$$Li_x(Ni_{1-y}M_y)O_2 \quad (A)$$

wherein M is one or more elements selected from the group consisting of Co, Mn and Fe; x is 0.9 or more and 1.3 or less; and y is 0 or more and 0.7 or less.

4. The electrode mixture according to claim 1, wherein the coating material is an oxide containing Al.

5. The electrode mixture according to claim 1, wherein the electrically conductive material is a carbonaceous material.

6. An electrode comprising the electrode mixture according to claim 1 and an electrode collector.

7. A nonaqueous electrolyte secondary battery comprising a positive electrode, a negative electrode and an electrolyte, wherein the positive electrode is the electrode according to claim 6.

8. The nonaqueous electrolyte secondary battery according to claim 7, further comprising a separator.

9. The nonaqueous electrolyte secondary battery according to claim 8, wherein the separator is composed of a laminated film comprising a porous film and a heat resistant porous layer laminated thereon.

10. An electrode mixture paste containing the electrode mixture according to claim 1 and water.

* * * * *